United States Patent
Browne et al.

(10) Patent No.: US 7,043,005 B2
(45) Date of Patent: May 9, 2006

(54) CALL PROCESSING WITH STATISTICAL WEIGHTING OF SCRIPTS IN A COMMUNICATION SYSTEM SWITCH

(75) Inventors: Nigel A. Browne, Jersey City, NJ (US); Stephen F. Okinow, Short Hills, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 568 days.

(21) Appl. No.: 10/072,063

(22) Filed: Feb. 6, 2002

(65) Prior Publication Data

US 2003/0147521 A1    Aug. 7, 2003

(51) Int. Cl.
*H04M 3/00* (2006.01)
*H04M 5/00* (2006.01)

(52) U.S. Cl. .............................. 379/265.02; 379/266.08

(58) Field of Classification Search ................................ 379/265.01–266.1, 309, 219, 220.01

See application file for complete search history.

(56) References Cited

U.S. PATENT DOCUMENTS

| | | | | |
|---|---|---|---|---|
| 5,335,268 A | * | 8/1994 | Kelly et al. | 379/112.05 |
| 5,740,233 A | * | 4/1998 | Cave et al. | 379/112.06 |
| 5,740,238 A | * | 4/1998 | Flockhart et al. | 379/266.05 |
| 5,963,635 A | * | 10/1999 | Szlam et al. | 379/309 |
| 6,751,310 B1 | * | 6/2004 | Crossley | 379/266.07 |

* cited by examiner

*Primary Examiner*—Benny Quoc Tieu
(74) *Attorney, Agent, or Firm*—Ryan, Mason & Lewis, LLP

(57) ABSTRACT

Calls or other communications are processed in a system switch in accordance with a statistical control mechanism based on the assignment of weightings to call vectors or other processing scripts. The processing scripts specify operations to be performed in processing the communications in the switch, and each of at least a subset of the scripts in a set of processing scripts has a weighting associated therewith. A particular one of the processing scripts is selected for application to a given one of the communications in accordance with the assigned weightings, e.g., using a round-robin selection process. Advantageously, the assigned weightings are configured to provide a desired usage for each of the processing scripts over a given number of the communications, such that switch processing efficiency is improved, and load balancing across distributed switch processing elements is facilitated.

12 Claims, 7 Drawing Sheets

Vector 20
1 wait-time 0 secs hearing ringback
2 consider skill 5 pri m adjust-by 0
3 goto step 6 if ewt for skill best = 0
4 consider location 1 adjust-by 0
5 consider location 2 adjust-by 0
9 queue-to best Vector 21
1 wait-time 0 secs hearing ringback
2 queue-to skill 5 pri m

FIG. 5A display vdn 51234

VECTOR DIRECTORY NUMBER

Extension: 51234
        Name: BSR LEAD

| Vector Number: 20 | Weight: 1 |
| Vector Number: 21 | Weight: 1 |
| Vector Number: | Weight: |
| Vector Number: | Weight: |
| Vector Number: | Weight: |

Allow VDN Override? n
                COR: 1
                 TN: 1
         Measured: both
Acceptable Service Level (sec): 30
VDN of Origin Annc. Extension:
             1st Skill:
             2nd Skill:
             3rd Skill:

FIG. 5B

Vector 20
1 wait-time 0 secs hearing ringback
2 consider skill 5 pri m adjust-by 0
3 goto step 6 if ewt for skill best = 0
4 consider location 1 adjust-by 0
5 consider location 2 adjust-by 0
9 queue-to best Vector 21
1 wait-time 0 secs hearing ringback
2 consider skill 5 pri m adjust-by 0
3 goto step 6 if ewt for skill best = 0
4 consider location 3 adjust-by 0
5 consider location 4 adjust-by 0
9 queue-to best Vector 22
1 wait-time 0 secs hearing ringback
2 queue-to skill 5 pri m

FIG. 6A display vdn 51234

VECTOR DIRECTORY NUMBER

Extension: 51234
Name: BSR LEAD

Vector Number: 20    Weight: 1
Vector Number: 21    Weight: 1
Vector Number: 22    Weight: 2
Vector Number:    Weight:
Vector Number:    Weight:

Allow VDN Override? n
COR: 1
TN: 1
Measured: both
Acceptable Service Level (sec): 30
VDN of Origin Annc. Extension:
1st Skill:
2nd Skill:
3rd Skill:

FIG. 6B

CALL PROCESSING WITH STATISTICAL WEIGHTING OF SCRIPTS IN A COMMUNICATION SYSTEM SWITCH

FIELD OF THE INVENTION

The invention relates generally to call processing in communication systems, and more particularly to systems in which calls or other communications are directed by a switch to or from telephones, computers or other types of user terminals.

BACKGROUND OF THE INVENTION

Conventional communication system switches include private branch exchanges (PBXs), automatic call distribution (ACD) systems, computer-telephony integration (CTI)-based systems, and other premises or enterprise-based call processing elements, as well as portions or combinations of these and other types of systems.

An important application of such switches is in a call center. Call centers distribute calls and other types of communications to available call-handling service agents in accordance with various predetermined criteria. In existing call center systems, the criteria for handling a call are often programmable by the operator of the system via a capability known as call vectoring. Typically, when the system detects that an agent has become available to handle a call, the system identifies the call-handling skills of the agent, usually in some order of priority, and delivers to the agent the longest-waiting call that matches the agent's highest-priority skill. This type of skills-based queuing allows each agent to be placed into a number of different service categories based on the skill types supported by that agent. Additional details regarding these and other call distribution techniques are described in, e.g., U.S. Pat. Nos. 5,740,238, 5,754,639 and 6,049,547, all of which are hereby incorporated by reference herein.

The implementation of call vectoring in a given communication system switch generally involves the use of a processing script, also referred to as a vector. Such a script may comprise a software program or suitable portion thereof having program instructions for directing the switch to apply particular processing operations to a given call when the script is invoked. In the call center context, the script may direct that a given call be queued to a certain agent, that particular announcements be played, and so on.

There are a number of significant problems with the conventional script processing approach in a communication system switch. One such problem is that the switch typically applies the same or a similar script to all incoming calls of a particular type or in a given processing application. This is inefficient in that it unduly limits the flexibility of the system in processing calls, increases script complexity, and requires that valuable switch processor cycles be expended for executing the script for every call.

SUMMARY OF THE INVENTION

The present invention addresses one or more of the above-noted problems by providing techniques for statistical weighting of processing scripts in a communication system switch.

In accordance with one aspect of the invention, calls or other communications are processed in a system switch in accordance with a statistical control mechanism based on the assignment of weightings to call vectors or other processing scripts. The processing scripts specify operations to be performed in processing the communications in the switch, and each of at least a subset of the scripts in a set of processing scripts has an assigned weighting associated therewith. A particular one of the processing scripts is selected for application to a given one of the communications in accordance with the assigned weightings. The assigned weightings are configured to provide a desired usage for each of the processing scripts over a given number of the communications.

The assigned weightings may comprise an integer value for each of the processing scripts in the set of processing scripts. For example, the weightings may comprise a set of equal numerical value weightings for each of the processing scripts in the set of processing scripts, with the particular one of the processing scripts selected from among the equally-weighted processing scripts in accordance with a round-robin selection process. The weightings may alternatively be specified as percentages, as frequencies, or using other values.

In accordance with another aspect of the invention, weightings may be assigned to a particular line or lines of one or more processing scripts, such that a desired usage is provided for the particular line or lines.

The invention may be implemented in a distributed switch having multiple processing elements associated therewith, with the assigned weightings providing a desired distribution of call processing operations across the multiple processing elements.

Advantageously, the use of assigned weightings in accordance with the present invention can improve switch processing efficiency and flexibility, while also reducing script complexity. In addition, the invention facilitates load balancing across the above-noted distributed switch processing elements.

BRIEF DESCRIPTION OF THE DRAWINGS

FIGS. 5A and 5B show example scripts and a corresponding administration screen, respectively, for implementing statistically weighted script processing in accordance with the invention.

FIGS. 6A and 6B show another set of example scripts and a corresponding administration screen, respectively, for implementing statistically weighted script processing in accordance with the invention.

DETAILED DESCRIPTION OF THE INVENTION

Although the invention will be illustrated below in conjunction with the processing of calls in an exemplary communication system suitable for configuration as a call center, it is not limited to use with any particular configuration of system elements or communication processing application. Those skilled in the art will recognize that the disclosed techniques may be used in any communication system application in which it is desirable to provide improved script-based call processing in a system switch. For example, the disclosed techniques can be can be used with private-branch exchange (PBX) systems, automatic call distribution (ACD) systems, computer-telephony integration (CTI)-based systems, as well as in portions or combinations of these and other types of systems. In addition, the invention is applicable to the processing of incoming communications, outgoing communications or both. The term "call" as used herein is intended to include not only incoming or outgoing telephone calls but also non-telephonic communications such as data transmissions, voice-over-IP, e-mail, facsimile, etc.

Figure 1:
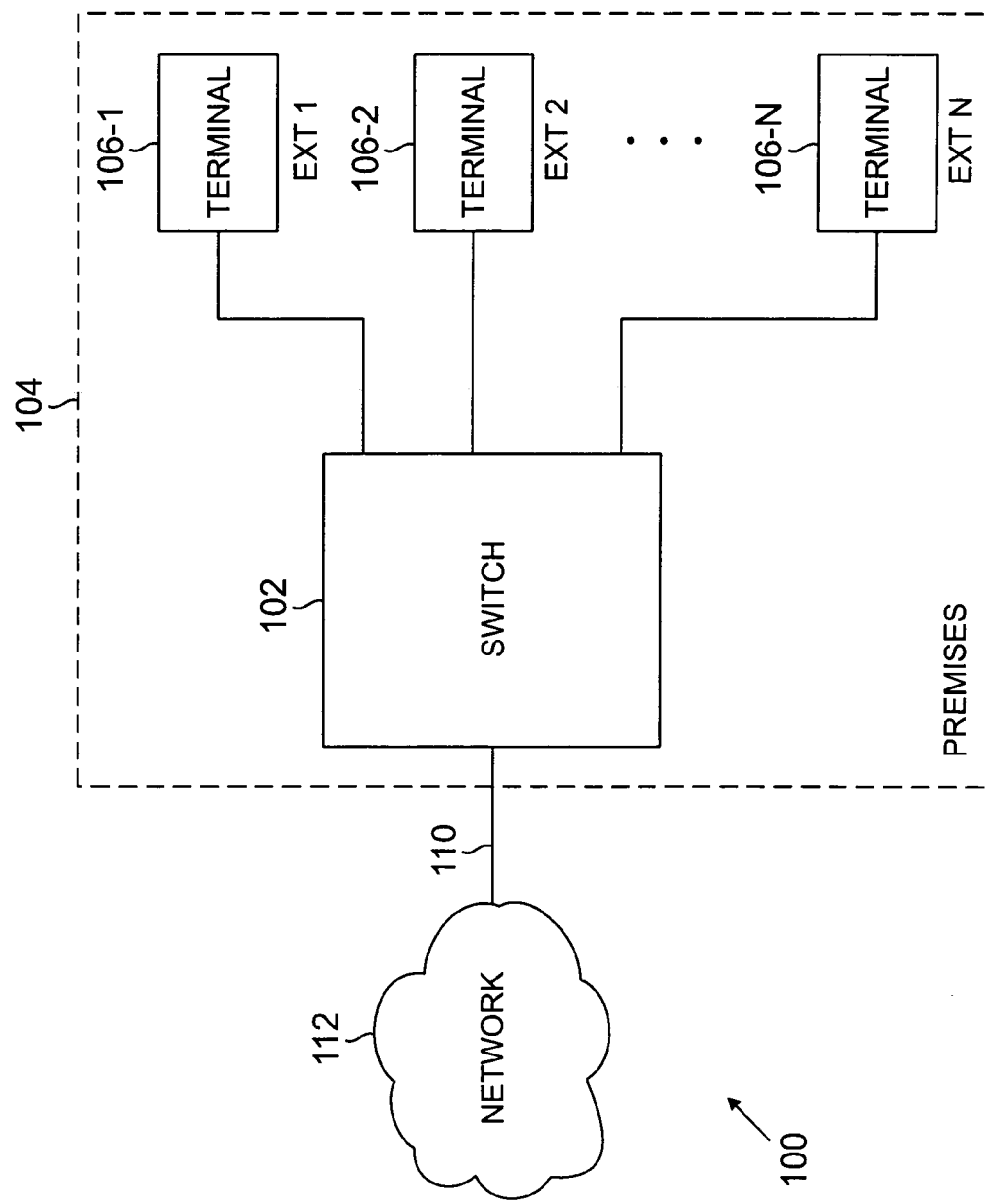
FIG. 1 shows an exemplary communication system in which the invention is implemented.

FIG. 1 shows an exemplary communication system 100 in which the invention is implemented. The system 100 includes a switch 102 which serves a premises 104 having a number of terminals 106-1, 106-2, . . . 106-N. Each of the terminals 106-1, 106-2, . . . 106-N corresponds to one of a set of internal extensions Ext1, Ext2, . . . ExtN as shown. These extensions are referred to herein as "internal" in that they are extensions within the premises 104 that are directly serviced by the switch. More particularly, these extensions correspond to conventional terminal endpoints serviced by the switch, and the switch can direct incoming calls to and receive outgoing calls from these extensions in a conventional manner.

In a call center application of the system 100, each of the terminals 106-1, 106-2, . . . 106-N may correspond to an agent workstation. Such a workstation may comprise a computer having telephony capability, a telephone station with an associated video display terminal, etc.

Although switch 102 is shown as associated with the premises 114 in this embodiment, the invention does not require that the switch 102 be so configured. Alternatively, the switch 102 may be implemented as a distributed switch which includes switch processing elements at multiple locations, networked together in a conventional manner.

The term "switch" as used herein should be understood to include a PBX, an enterprise switch, or other type of telecommunications system switch, as well as other types of processor-based communication control devices such as servers, computers, routers, adjuncts, etc., including a distributed switch such as that referred to above.

By way of example, the switch 102 in the illustrative embodiment may be implemented as an otherwise conventional DEFINITY® Enterprise Communication Service (ECS) communication system switch available from Avaya Inc. of Basking Ridge, N.J., USA. Other types of known switches may be used. The conventional aspects of such switches are well known in the art and therefore not described in detail herein.

The terminals 106 may be wired desktop telephone terminals or any other type of terminals capable of communicating with the switch 102. The word "terminal" as used herein should therefore be understood to include not only wired or wireless desktop telephone terminals, but also other types of processor-based communication devices, including but not limited to mobile telephones, personal computers, personal digital assistants (PDAs), etc.

The switch 102 is also coupled via one or more trunk lines 110 to a network 112. The network 112 may comprise, e.g., a public switched telephone network (PSTN). The trunk lines 110 carry incoming calls from the network 112 to the switch 102 for processing, and carry outgoing calls from the switch 102 to the network 112. The network 112 may also or alternatively comprise a computer network such as the Internet, a wireless cellular network, a satellite network, as well as portions or combinations of these and other networks.

It should be noted that the invention does not require any particular type of information transport media between switch 102, network 112 and terminals 116, i.e., the invention may be implemented with any desired type of transport medium as well as combinations of different types of transport media.

The switch 102 may be connected to one or more external endpoints, e.g., external terminals or system processing elements, via network 112 or other suitable communication channel(s).

As will be described in greater detail below, the present invention in accordance with one aspect thereof configures the switch 102 to provide statistical weighting of call processing scripts. Advantageously, this overcomes the previously-described problems associated with conventional script processing.

It should be emphasized that the configuration of the switch, user terminals and other elements as shown in FIG. 1 is for purposes of illustration only, and should not be construed as limiting the invention to any particular arrangement of elements.

Figure 2:
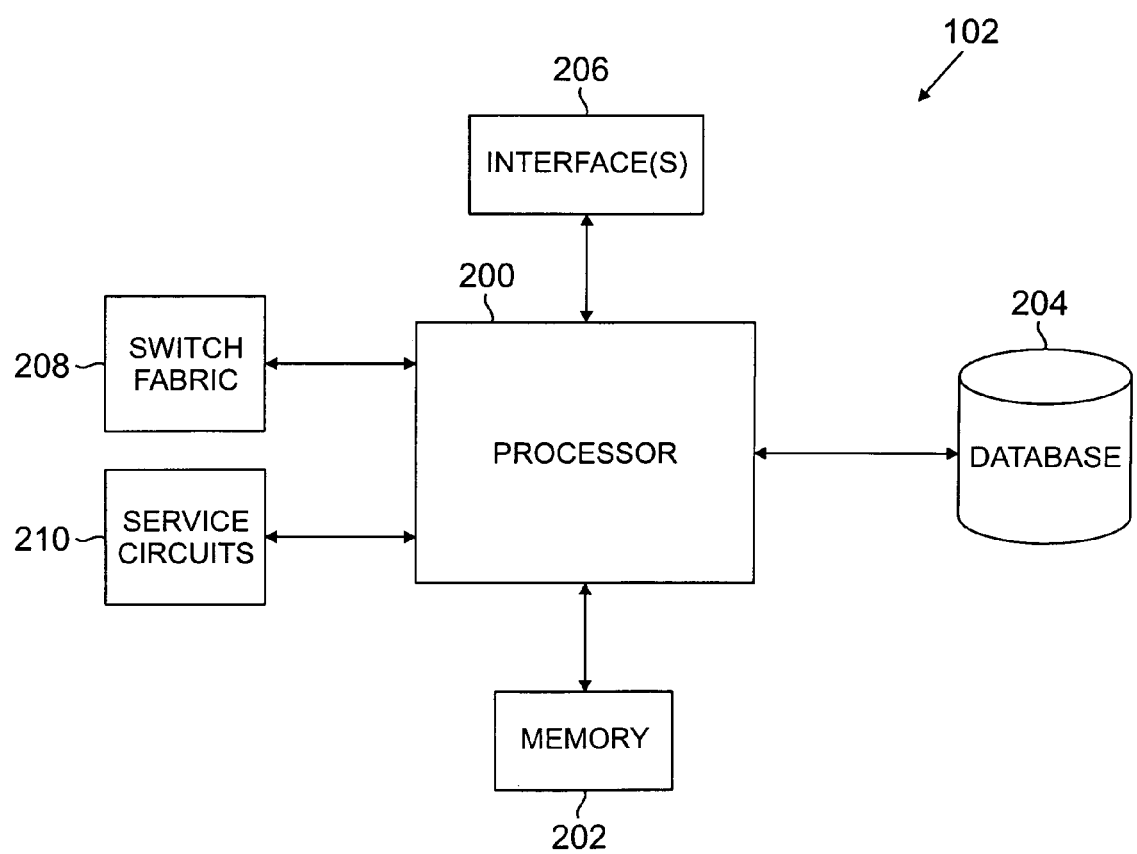
FIG. 2 is a block diagram showing one possible implementation of a switch of the FIG. 1 system.

FIG. 2 shows a more detailed view of one possible implementation of the switch 102 in the system of FIG. 1. The switch 102 in this implementation includes a processor 200, a memory 202, a database 204, one or more interfaces 206, a switch fabric 208, and a set of service circuits 210. The processor 200 may be implemented as a central processing unit (CPU), microprocessor, application-specific integrated circuit (ASIC) or other type of digital data processor, as well as various portions or combinations of such elements. The memory 202 may be a random access memory (RAM), a read-only memory (ROM) or combinations of these and other types of electronic memory devices.

The processor 200 operating in conjunction with the memory 202 executes one or more software programs for providing script processing and other functions within the switch 102. Such programs may be stored in memory 202 or another storage device accessible to the switch 102 and executed by processor 200 in a conventional manner.

The database 204 may be, e.g., an optical or magnetic disk-based storage device, or other conventional storage device associated with or otherwise accessible to the switch 102. The database 204 may be used to store, e.g., feature assignments to particular feature buttons or codes, directory number assignments to corresponding call appearances or direct facility termination keys, access restrictions, and other administrative information regarding the configuration of the system 100, as well as other types of information.

The service circuits 210 may include tone generators, announcement circuits, etc. These circuits and the interfaces 206 are controlled by processor 200 in implementing call processing functions in the switch 102.

The switch 102 may include additional elements which are omitted from FIG. 2 for simplicity and clarity of illustration. For example, the switch may include a port card for each type of user terminal associated therewith. In addition, it will be appreciated by those skilled in the art that the switch 102 may be configured to support multiple user terminals of different types, e.g., wired deskset terminals, wireless deskset terminals, personal computers, video telephones or other advanced terminals, etc.

Also associated with the switch 102 may be an administrator terminal (not shown) which is used to program the operation of the switch 102 during a system administration, e.g., an initial set-up and configuration of the system or a subsequent system-level or user-level reconfiguration.

Other devices not shown in the figures may be associated with the switch 102, such as an adjunct feature server. Such an adjunct may be physically incorporated within the switch, and may be partially or completely implemented using other switch elements such as processor 200 and memory 202.

As indicated previously, the present invention in an illustrative embodiment provides a capability in the switch 102 for statistical weighting of call processing scripts. The term "script" as used herein is intended to include a call processing vector or other set of program code or instructions executable at least in part by a processing element of the switch 102, e.g., by processor 200 of FIG. 2. The term is also intended to include other types and arrangements of call processing instructions, such as access lists that are applied to outgoing calls or requests to access to network to which the switch is connected. It should be noted that the latter fall within the definition of "call" previously provided herein.

An example of a script is a preprocessing script which specifies certain operations to be performed in switch 102 for a given call prior to delivery of the call to a system endpoint, e.g., to one of the terminals 106. Advantageously, the invention allows a statistical distribution of calls to scripts within the switch 102, thereby improving switch processing efficiency and flexibility, and avoiding the problems associated with conventional unweighted script processing. The invention also facilitates call load sharing between distributed switch elements that are networked together. Moreover, the invention permits a simplified implementation of scripts that would otherwise be significantly more complex if implemented using only currently available script processing techniques.

Although the invention will be illustrated below in conjunction with the processing of incoming calls, it is to be appreciated that the described techniques are also applicable to outgoing calls, as well as to other types of communications, as was previously noted. In addition, those skilled in the art will recognize that the present invention is suitable for use in data switching systems as well as voice switching systems.

In the examples given below, calls arriving at the switch 102 are acted upon by a script-based pre-processing mechanism before being routed to a destination. As indicated above, this is merely an illustrative processing context in which the invention may be utilized, and should not be construed as limiting the scope of the invention in any way.

Figure 3A:
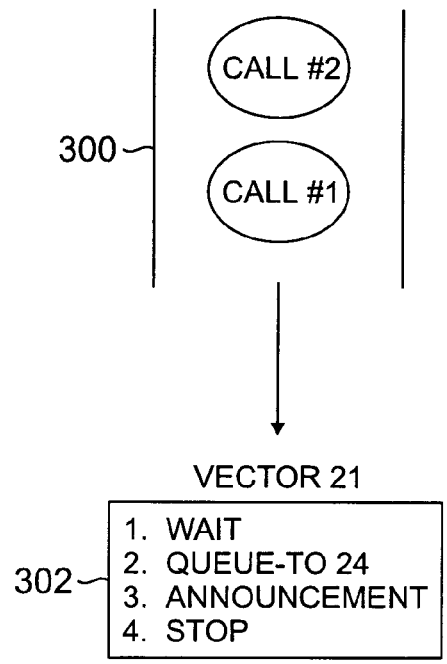
FIGS. 3A and 3B illustrate call processing using an unweighted script and a set of statistically weighted scripts in accordance with the invention, respectively.

FIG. 3A illustrates an example call processing operation that may be implemented in the FIG. 1 system using an unweighted script. In this example, a set of incoming calls 300 including Call #1, Call #2, etc. is processed by applying a script 302 to each of the calls. The script 302 in this example is a call vector or preprocessing script denoted Vector 21, and includes the following four processing operations:

1. Wait
2. Queue-to 24
3. Announcement
4. Stop

In accordance with the conventional practice previously described, Vector 21 is applied to each of the calls in the set of incoming calls 300. As a result, this unweighted script approach suffers from the problems of the conventional approaches identified above, including inefficiency, limited flexibility, and excessive use of switch processor cycles.

Figure 3B:
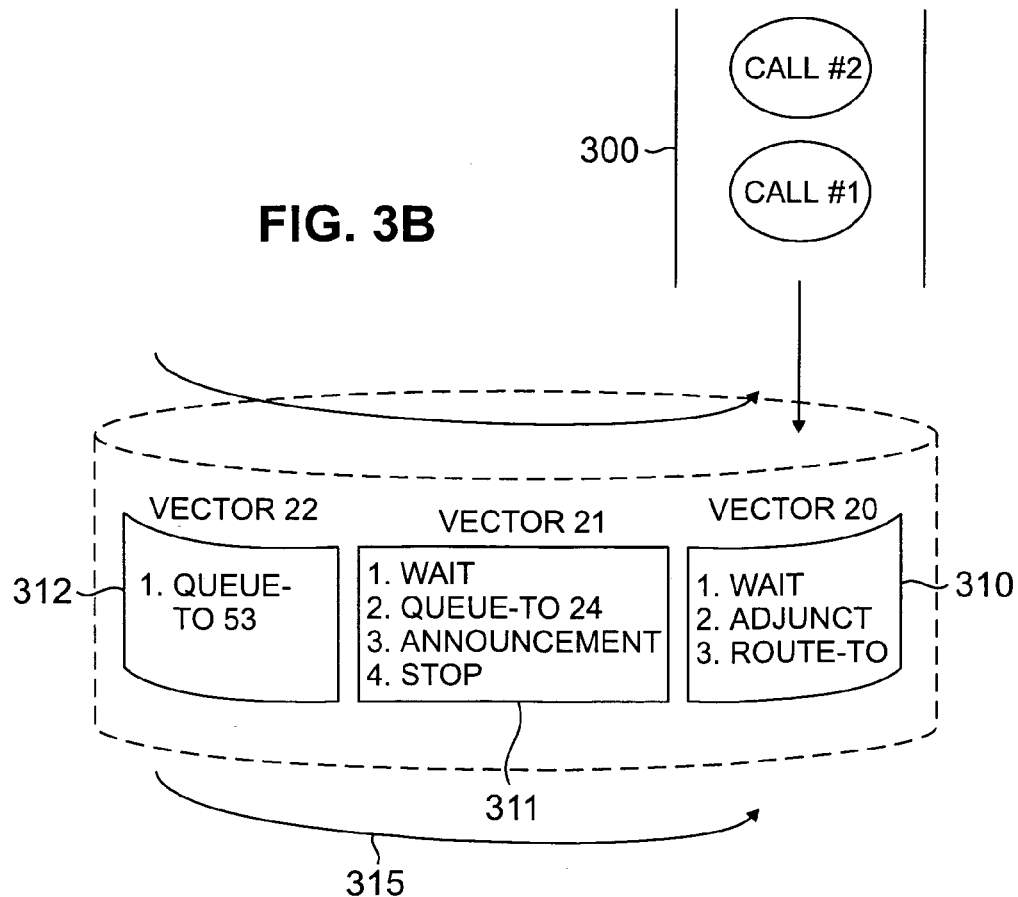

FIG. 3B illustrates an improved approach utilizing statistically weighted scripts in accordance with the invention. In this example, the incoming calls in the set of calls 300 are delivered in a round-robin manner to different processing scripts. The processing scripts shown in the figure include call vectors or preprocessing scripts 310, 311 and 312, also denoted Vector 20, Vector 21 and Vector 22, respectively. Vector 21 corresponds to script 302 as previously described, and is relabeled as script 311 in FIG. 3B. The script 310 includes the following three processing operations:

1. Wait
2. Adjunct
3. Route-to

The script 312 includes a single processing operation as follows:

1. Queue-to 53

The scripts in FIG. 3B may be viewed illustratively as being arranged on an outer side surface of a "cylinder" shown in dashed lines in the figure. Additional scripts other than those shown may be included in a group of scripts from which scripts are selected in accordance with the statistical weighting techniques of the invention. A single selected one of the scripts is applied to a particular one of the calls in the set of calls 300, with the selection process proceeding around the cylinder in the direction of the arrow 315. More particularly, if scripts 310, 311 and 312 denote the full set of scripts to be utilized, script 310 is applied to Call #1, with script 312 being applied to Call #2, and so on.

The arrangement illustrated in FIG. 3B allows a statistical weighting of the processing scripts in terms of their application to incoming calls, as will be described in greater detail below. Advantageously, this allows a designated fraction of the incoming calls to be handled by one routing application, such as best split routing (BSR), while other fractions of the calls are handled by other applications. As a result, call processing operations in the switch 102 are made more flexible and efficient, load sharing between distributed switch processing elements is facilitated, and script implementation is simplified.

The particular example processing operations included in the vectors of FIGS. 3A and 3B, as well as those included in other vectors or processing scripts described herein, are of a conventional type well understood to those skilled in the art, and are therefore not described in further detail herein. Additional information regarding these and other processing operations suitable for use in conjunction with the present invention may be found in, e.g., the DEFINITY® ECS Administrator's Guide, Release 9, Document No. 555-233-506, which is incorporated by reference herein, and in the above-cited U.S. Pat. Nos. 5,740,238, 5,754,639 and 6,049,547.

Figure 4:
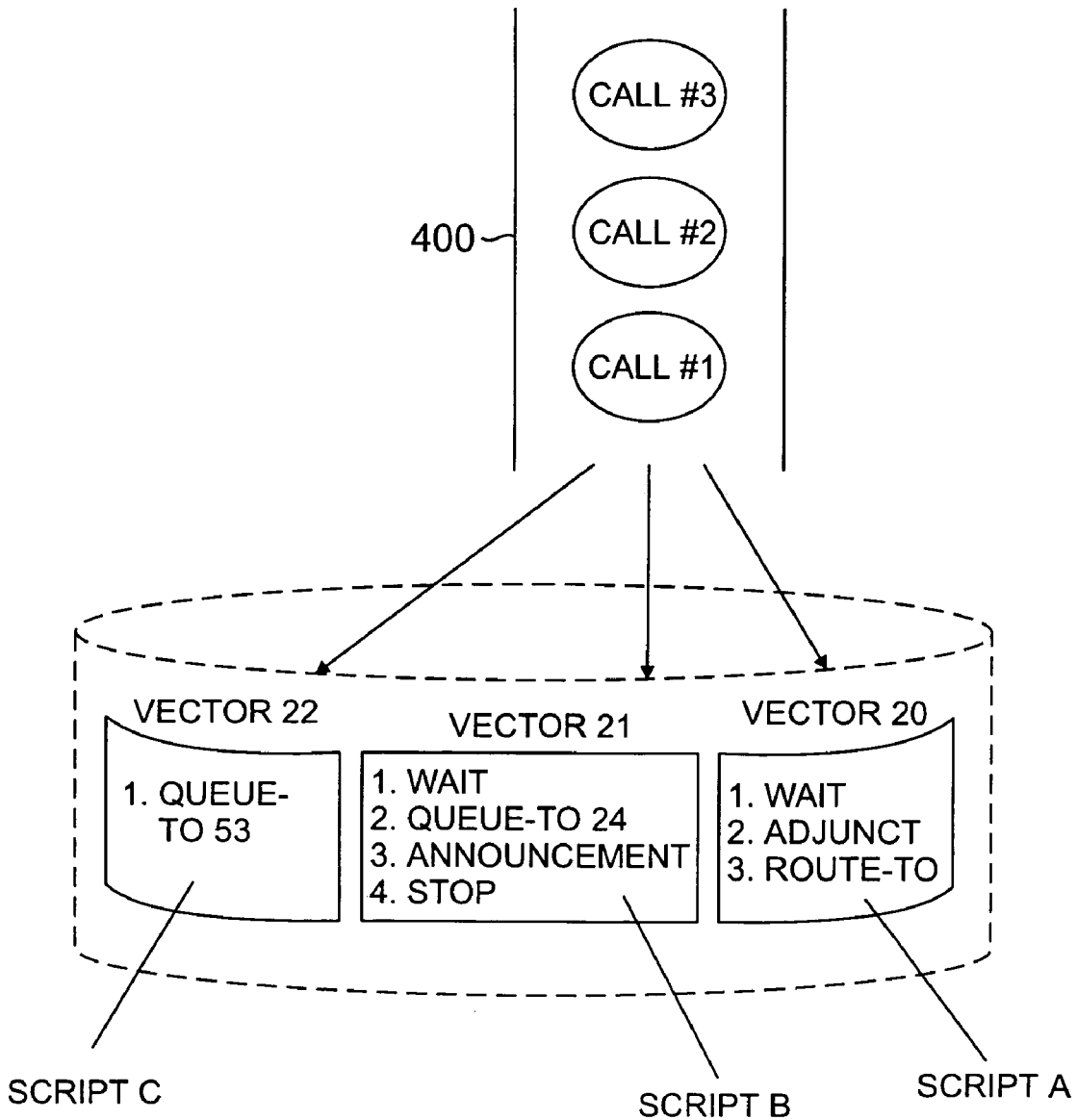
FIG. 4 shows another example of call processing using statistically weighted scripts in accordance with the invention.

FIG. 4 provides further illustration of the manner in which statistical weighting of processing scripts may be implemented in accordance with the invention. The implementation of statistical weighting as described herein will also be referred to generally as a statistical control mechanism. This example uses the same set of call vectors or pre-processing scripts used in FIG. 3B, i.e., Vector 20, Vector 21 and Vector 22. For simplicity of subsequent description, these are denoted as Script A, Script B and Script C, respectively. A set of calls 400 including Call #1, Call #2, Call #3, etc. is processed using the set of scripts in a manner which provides a statistical weighting of the scripts. In accordance with the invention, a weighting is assigned to each of the scripts. For example, a weighting may be assigned to each of the scripts in a system administration screen associated with the switch 102 as follows:

| Script | A | Weight | 1 |
|--------|---|--------|---|
| Script | B | Weight | 1 |
| Script | C | Weight | 1 |
| Script |   | Weight |   |

This sample system administration screen allows a user to enter a script and its corresponding weighting. A line or field with no entry is assumed to be "null" and is not considered in call pre-processing. In this example, an equal numerical value, i.e., a value of "1," is assigned to each of the scripts in the set of scripts A, B and C. This provides a substantially equal distribution of the incoming calls among the scripts. More particularly, the system 100 in this example will process the calls as follows:

Step 1: Call #1 enters the system
Step 2: Call #1 is processed by Script A
Step 3: Call #2 enters the system
Step 4: Call #2 is processed by Script B
Step 5: Call #3 enters the system
Step 6: Call #3 is processed by Script C
Step 7: Call #4 enters the system
Step 8: Call #4 is processed by Script A The next call into the system is processed by Script B, the next call processed by Script C, and so on.

By adjusting the weightings in the system administration screen, one can alter the fraction of calls processed by each of the scripts. For example, the weighting associated with Script B may be changed from "1" to "2" as indicated below.

| Script | A | Weight | 1 |
|--------|---|--------|---|
| Script | B | Weight | 2 |
| Script | C | Weight | 1 |
| Script |   | Weight |   |

The resulting call processing is then as follows:
Step 1: Call #1 enters the system
Step 2: Call #1 is processed by Script A
Step 3: Call #2 enters the system
Step 4: Call #2 is processed by Script B
Step 5: Call #3 enters the system
Step 6: Call #3 is processed by Script C
Step 7: Call #4 enters the system
Step 8: Call #4 is processed by Script B The next call into the system is processed by Script A, the next call processed by Script B, the next call processed by Script C, and so on.

Another example of the effect of adjusting the statistical control mechanism is given below, in which scripts B and C are assigned respective weightings of "3" and "2":

| Script | B | Weight | 3 |
|--------|---|--------|---|
| Script | C | Weight | 2 |
| Script |   | Weight |   |
| Script |   | Weight |   |

The resulting call processing is then as follows:
Step 1: Call #1 enters the system
Step 2: Call #1 is processed by Script B
Step 3: Call #2 enters the system
Step 4: Call #2 is processed by Script C
Step 5: Call #3 enters the system
Step 6: Call #3 is processed by Script B
Step 7: Call #4 enters the system
Step 8: Call #4 is processed by Script C
Step 9: Call #5 enters the system
Step 10: Call #5 is processed by Script B
Step 11: Call #6 enters the system
Step 12: Call #6 is processed by Script B
Step 13: Call #7 enters the system
Step 14: Call #7 is processed by Script C The next call into the system is processed by Script B, the next call processed by Script C, the next call processed by Script B, and so on.

In the above examples, the weightings are specified as numerical values, i.e., positive integers. Other weighting formats can also be used in implementing the statistical control mechanism. For example, the weightings may be specified as percentage values. More particularly, a percentage value may be specified for one or more of the scripts, as in the following:

| Script | A | Percentage | 80% |
|--------|---|------------|-----|
| Script | B | Percentage | 20% |

As another example, frequency values may be used, with one or more of the frequency values specifying a desired frequency of utilization for its corresponding processing script:

| Script | A | Frequency | every 5 seconds |
|--------|---|-----------|-----------------|
| Script | B | Frequency | default         |

In the above, Script A will be executed at a rate approximating every five seconds, regardless of the incoming call rate, while Script B is assigned a default value. The default value may be designed such that a script assigned that value is not limited as to its frequency of application. An arrangement of the type described above is particularly useful in a situation in which call rates are very different at different times of the day.

As yet another example, a line-based statistical control mechanism may be implemented in which one or more of the scripts each include multiple lines of code, and weightings are assigned to the different lines of code, as in the following:

| Script | A/line 1 | Percentage | 28%           |
|--------|----------|------------|---------------|
| Script | B/line 3 | Percentage | unconditional |

This arrangement may be applied to any designated line or lines of any of the scripts, in any desired combination. In the above, the indication of "unconditional" for a particular line of a given script specifies that there is no statistical limitation on that line. A specified numerical, percentage or frequency value could also be used.

As indicated previously, the switch 102 may be implemented as an otherwise conventional DEFINITY® ECS communication system switch. This example switch typically utilizes a vector directory number (VDN) to identify a particular vector. In accordance with the invention, the ECS switch may be modified such that the VDN identifies a list of vectors or scripts from which particular scripts are selected for application to a given call in the manner described previously. A system administration screen or other suitable mechanism may be used to assign weightings for the particular scripts of a given VDN, utilizing the techniques described in conjunction with the previous examples. FIGS. 5A, 5B, 6A and 6B show additional examples illustrating the operation of the statistical control mechanism for an exemplary VDN, denoted herein as VDN 51234.

In FIG. 5A, example vectors or scripts denoted Vector 20 and Vector 21 are shown. It should be noted that these scripts include different processing operations than the scripts described in conjunction with FIGS. 3A, 3B and 4. FIG. 5B shows an example system administration screen that is used to implement a statistical control mechanism between Vector 20 and Vector 21 of FIG. 5A. The screen identifies the vector numbers for VDN 51234 as Vector 20 and Vector 21, and specifies a numerical weighting of "1" for each. This results in Vector 20 and Vector 21 alternatively being applied to incoming calls, such that each is utilized for 50% of the incoming calls. If Vector 20 had a weight of "1" and Vector 21 had a weight of "2" then Vector 20 would receive approximately 33.3% of the calls and Vector 21 would receive approximately 66.7% of the calls. The illustrated statistical control mechanism thus allows a particular type of script-based pre-processing, such as BSR processing, to be applied to every $2^{nd}$ call, every $3^{rd}$ call, and so on, thereby conserving switch processor resources.

The example administration screen as illustrated in FIG. 5A, and other screens shown or described herein, include additional information not directly relevant to the statistical weighting techniques of the present invention, such as an override indicator, class of restriction (COR), tenant partitioning identifier (TN), measurement indicator (internal, external or both), acceptable service level, etc. Additional details regarding these and other aspects of the call vectors and administration screens of FIGS. 5 and 6 may be found in the above-cited DEFINITY® ECS Administrator's Guide, Release 9, Document No. 555-233-506.

FIG. 6A shows another example set of scripts denoted Vector 20, Vector 21 and Vector 22. Vectors 20 and 22 in this example correspond generally to Vector 20 and Vector 21 of FIG. 5A. Vector 21 in FIG. 6A is similar to Vector 20 of FIG. 6A but specifies in steps 4 and 5 consideration of locations 3 and 4, respectively. FIG. 6B shows an administration screen in which a weighting of "1" is assigned to Vector 21, a weighting of "1" is assigned to Vector 21, and a weighting of "2" is assigned to Vector 22. This assignment would result in 50% of the incoming calls being handled by Vector 22 and the remaining 50% being handled by Vectors 20 and 21 at 25% each.

The invention can thus facilitate call distribution or load sharing across multiple processing element locations in a distributed switch of a multi-site call center. More specifically, assume a primary processing element in the multi-site call center is receiving a maximum of 30,000 busy hour calls, or 500 calls per second. The processor occupancy for the switch will be extremely high if all of these calls go through a consider step for BSR, in accordance with conventional practice, even though the percentage of calls that actually get transferred due to BSR may be only about 33% or less or about 10,000 calls. The invention allows the desired statistical distribution to be provided while conserving switch processor resources. That is, the incoming call traffic can be separated using the techniques of the invention such that only every third call went through a script with a consider step. As a result, 20,000 calls in the present example would not go through the consider step, while 10,000 of the calls would go through the consider step and could be potentially transferred. The results for the multi-site call center operator would be substantially the same, but the processor load on the distributed switch processing elements would be reduced to ⅓ of that required in the conventional case.

It should be noted that assignment of weightings to scripts using data entry via a system administration screen is used merely to illustrate the principles of the invention, and should not be construed as limiting in any way. Numerous other techniques may be used to assign weightings to scripts in accordance with the invention. For example, such weightings may be assigned under program control, using appropriately programmed software instructions, or from remote locations over network connections established with the switch, etc.

As previously noted, the call processing functions described above in conjunction with the illustrative embodiments of the invention may be implemented in whole or in part in the switch 102, e.g., in call processing software thereof utilizing processor 200 and memory 202. Other suitable combinations of hardware and/or software may be used to implement the call processing functions of the invention. For example, the system administration screens described herein may be implemented in a straightforward manner as software-driven displays on a computer monitor forming a portion of the interface(s) 206 of switch 102.

Again, the particular individual processing operations shown in the vectors of FIGS. 5A and 6A are of a type known in the art, and are therefore not further described herein. As mentioned previously, additional details can be found in the above-cited DEFINITY® ECS Administrator's Guide, Release 9, Document No. 555-233-506. However, the invention does not require the use of any particular processing operations or set of such operations.

It should again be emphasized the above-described embodiments are illustrative only. Alternative embodiments may utilize different switch and terminal configurations, different types and arrangements of call processing scripts, and different weight assignment formats and techniques. These and numerous other alternative embodiments within the scope of the following claims will be apparent to those skilled in the art.

What is claimed is:

1. A method of processing communications in a communication system switch, the method comprising the steps of:

assigning weightings to a set of processing scripts, the processing scripts specifying operations to be performed in processing the communications in the switch, such that each of at least a subset of the scripts in the set of processing scripts has a weighting associated therewith; and selecting a particular one of the processing scripts for application to a given one of the communications in accordance with the assigned weightings;

wherein the assigned weightings are configured to provide a desired usage for at least a portion of each of the processing scripts over a given number of the communications.

2. The method of claim 1 wherein the assigned weightings comprise a set of equal weightings for each of the processing scripts in the set of processing scripts.

3. The method of claim 2 wherein the selecting step comprises selecting the particular one of the processing scripts from among the equally-weighted processing scripts in accordance with a round-robin selection process.

4. The method of claim 1 wherein the assigned weightings comprise an integer value for each of the processing scripts in the set of processing scripts.

5. The method of claim 4 wherein the same integer value is assigned to each of the processing scripts in the set of processing scripts, the assigned weightings thereby providing a substantially equal usage of each of the processing scripts over the given number of the communications.

6. The method of claim 4 wherein different integer values are assigned to different ones of the processing scripts in the set of processing scripts, the assigned weightings thereby providing different usages for the different ones of the processing scripts over the given number of the communications.

7. The method of claim 1 wherein the assigned weightings comprise a percentage value for each of at least a subset of the processing scripts in the set of processing scripts, the percentage value specifying a desired percentage usage of its corresponding processing script.

8. The method of claim 1 wherein the assigned weightings comprise a frequency value for each of at least a subset of the processing scripts in the set of processing scripts, the frequency value specifying a desired frequency of utilization for its corresponding processing script.

9. The method of claim 1 wherein one or more of the processing scripts each comprise multiple lines of code, and further wherein an assigned weighting for a given one of the processing scripts comprises a weighting for at least a particular one of the multiple lines of code.

10. The method of claim 1 wherein the communication system switch comprises a distributed switch having multiple processing elements associated therewith, the assigned weightings providing a desired distribution of communication processing operations across the multiple processing elements.

11. A communication system switch for processing communications, the switch comprising:

a memory for storing weightings assigned to a set of processing scripts, the processing scripts specifying operations to be performed in processing the communications in the switch, such that each of at least a subset of the scripts in the set of processing scripts has a weighting associated therewith; and a processor coupled to the memory, the processor being operative to select a particular one of the processing scripts for application to a given one of the communications in accordance with the assigned weightings;

wherein the assigned weightings are configured to provide a desired usage for at least a portion of each of the processing scripts over a given number of the communications.

12. An article of manufacture comprising a machine-readable storage medium storing one or more programs for use in processing communications in a communication system switch, wherein the one or more programs when executed implement the steps of:

assigning weightings to a set of processing scripts, the processing scripts specifying operations to be performed in processing the communications in the switch, such that each of at least a subset of the scripts in the set of processing scripts has a weighting associated therewith; and selecting a particular one of the processing scripts for application to a given one of the communications in accordance with the assigned weightings;

wherein the assigned weightings are configured to provide a desired usage for at least a portion of each of the processing scripts over a given number of the communications.

* * * * *